US012768640B2

(12) United States Patent
Van Lierop et al.

(10) Patent No.: US 12,768,640 B2
(45) Date of Patent: Oct. 20, 2026

(54) OPTICAL COHERENCE TOMOGRAPHY SYSTEM AND METHOD

(71) Applicant: Scinvivo B.V., Eindhoven (NL)

(72) Inventors: Hendrikus Wilhelmus Leonardus Antonius Maria Van Lierop, Weert (NL); Ibeltje Maria De Jong, Eindhoven (NL); Camile Nathan Van Der Heijden, Veldhoven (NL)

(73) Assignee: Scinvivo B.V., Eindhoven (NL)

( * ) Notice: Subject to any disclaimer, the term of this patent is extended or adjusted under 35 U.S.C. 154(b) by 159 days.

(21) Appl. No.: 18/864,187

(22) PCT Filed: May 10, 2023

(86) PCT No.: PCT/NL2023/050256
§ 371 (c)(1), (2) Date: Nov. 8, 2024

(87) PCT Pub. No.: WO2023/219501
PCT Pub. Date: Nov. 16, 2023

(65) Prior Publication Data
US 2025/0297850 A1 Sep. 25, 2025

(30) Foreign Application Priority Data
May 10, 2022 (NL) ...................................... 2031820

(51) Int. Cl.
*G01B 9/02091* (2022.01)
*G01B 9/02* (2022.01)

(52) U.S. Cl.
CPC ..... *G01B 9/02091* (2013.01); *G01B 9/02083* (2013.01)

(58) Field of Classification Search
CPC ............ G01B 9/02091; G01B 9/02083; A61B 5/0066
See application file for complete search history.

(56) References Cited

U.S. PATENT DOCUMENTS

2012/0307014 A1* 12/2012 Wang ................. G01B 9/02091 348/46
2017/0000327 A1* 1/2017 Fingler .............. G01B 9/02091
(Continued)

FOREIGN PATENT DOCUMENTS

WO WO-2014018950 A1 * 1/2014 ......... G01B 9/02004

OTHER PUBLICATIONS

Tong Wu et al, Optics Letters, 2020, pp. 2470-2473, XP93026850.
(Continued)

*Primary Examiner* — Jonathan M Hansen
(74) *Attorney, Agent, or Firm* — Banner & Witcoff, Ltd.

(57) ABSTRACT

An optical coherence tomography (OCT) system (1) is provided that comprises a first system unit (10) and a second system unit (20). The first system unit (10) is configured to obtain OCT-scan data comprising a plurality of B-scan data sets ($B_1$,$B_{nB}$) from a target (T), each B-scan data set comprising a respective set of A-scan data sets ($A_{1,k}$,$A_{nA,k}$). The first system unit (10) is configured to obtain the OCT scan data by repeatedly obtaining an A-scan from the target with a first frequency while performing the B-scan with a second frequency, wherein said repeatedly obtaining with a first frequency and said scanning with a second frequency is performed with a mutually varying phase relationship ($\Delta_1$, $\Delta_{nB}$), said first frequency being greater than said second frequency. The second system unit (20) is configured to use information about said mutually varying phase relationship when generating the OCT-image (O) from the OCT-scan data ($B_1$,$B_{nB}$). Also an optical coherence tomography (OCT) method is provided.

20 Claims, 9 Drawing Sheets

(56) References Cited

U.S. PATENT DOCUMENTS

| | | | | |
|---|---|---|---|---|
| 2017/0020387 | A1* | 1/2017 | Fingler | G02B 6/0005 |
| 2018/0360307 | A1* | 12/2018 | Oh | A61B 5/0066 |
| 2020/0320754 | A1 | 10/2020 | Ashock et al. | |
| 2024/0085691 | A1* | 3/2024 | Tozburun | G02B 26/101 |
| 2025/0143566 | A1* | 5/2025 | Jonnal | A61B 3/113 |

OTHER PUBLICATIONS

Leong Yang Sing et al, ICEEI Conference, 2021, pp. 1-4, XP34029625.

Leong Yang Sing et al, IEEE Access, 2021, pp. 132715-132716, XP11881050.

International Search Report and Written Opinion—PCT/NL2023/050256—mailing date Nov. 16, 2023.

Loewke, Nathan O., et al. "Software-based phase control, video-rate imaging, and real-time mosaicing with a Lissajous-scanned confocal microscope." IEEE transactions on medical imaging 39.4 (2019): 1127-1137.

* cited by examiner

OPTICAL COHERENCE TOMOGRAPHY SYSTEM AND METHOD

CROSS-REFERENCE TO RELATED APPLICATIONS

This application is a U.S. National Stage application under 35 U.S.C. § 371 of International Application PCT/NL2023/050256 (published as WO 2023/219501 A1), filed May 10, 2023, which claims the benefit of priority to Application NL 2031820, filed May 10, 2022. Benefit of the filing date of these prior applications is hereby claimed. Each of these prior applications is hereby incorporated by reference in its entirety.

FIELD

The present application pertains to an optical coherence tomography system.

The present application further pertains to an optical coherence tomography method.

BACKGROUND

Optical coherence tomography (OCT) is an imaging technique that enables real-time, high resolution, in depth imaging of biological tissues. OCT can be used for minimally invasive disease diagnosis, optical biopsies, image guided surgery, and photodynamic therapy.

OCT is an imaging technology which, analogous to ultrasound, provides in-depth cross-sectional images of the examined tissue. In comparison with ultrasound, OCT makes use of light instead of soundwaves. The resolution of OCT is higher than that of ultrasound (in the micrometre range), and the penetration depth is lower than for ultrasound (in the millimetre range). Analogous to ultrasound, a depth scan at one lateral position of the target (e.g. a biological tissue), is called an A-scan, while a lateral scan transverse to the depth direction, so multiple A scans in a row, is called a B-scan.

OCT is a microscopic imaging technology, which means that it can be used to examine a small area of tissue at one time. Another name to describe OCT is 'optical biopsy' as it provides for a method to obtain information comparable to that obtainable with a real biopsy, while avoiding an invasive procedure.

OCT is already state of the art in ophthalmology, and more application areas are being developed. Early detection of cancerous tissue is one of the main goals in the medical world, and OCT is a useful tool for early cancer diagnosis, as it enables the physician to look inside the tissue with a high resolution.

One example of a medical area in which there is an unfulfilled need for better diagnostic technologies is urology. Current diagnostic techniques for bladder cancer have their limitations, resulting in large amounts of false positives and false negatives. With OCT, a cross-sectional image of the bladder wall can be provided to the urologist. Based on these OCT-images the urologist can make a more accurate diagnosis. To be able to use OCT inside the human body, it is necessary to put the technology in a small catheter that is watertight and can be sterilized.

Two types of catheters that are already developed for in vivo tissue imaging can be discerned: 1) forward looking catheters; and 2) sideway looking catheters. The sideway looking catheters are ideal for the imaging of tube-shaped organs, as the working distance is constant and therefore an automatic pull-back can be used to form a 3D image of the full tubular organ.

It is well known in the art that there is a need for forward looking endoscopic OCT catheters for in vivo use. Forward looking catheters are necessary to image hollow organs. Hollow organs cannot be imaged in the same way as tubular organs, as they are irregularly shaped and the working distance will change continuously. An automatic pull-back to form a 3D image in one go is not possible for these hollow organs. Examples of hollow organs are: bladder, uterus, stomach, and lungs.

Forward looking OCT catheters are designed for use in an endoscopic device with a camera. In that assembly the OCT catheter is directed to the same plane of view as the camera. Apart from hollow shaped organs, other interesting application areas for forward looking catheters are the vocal cords, the inner ear and laparoscopic surgery.

Forward looking OCT catheters are designed in two different ways: 1) based on a sweeping fibre inside the catheter; and 2) based on a microelectromechanical system (MEMS) mirror laser scanner. To be able to image a large field of view, a MEMS mirror based laser scanner module is necessary. This 1D or 2D scanner will steer the light to the tissue, collect the back reflected light from the tissue, and guide it back into the optical fibre.

MEMS are a combination of micro-optics, microelectronics, and micromechanics. With high-tech semi-conductor processes a device can be built layer by layer on microscopic scale. MEMS are very beneficial for use in biomedical imaging applications as they are very small, can operate at high speed to enable real time imaging, are easy to integrate with the rest of the optical system, are cheap to manufacture, and have a low power consumption.

The lateral resolution with which OCT-image data can be obtained in a single B-scan is determined by the A-scan/B-scan frequency ratio, i.e. the number of A-scans performed in a B-scan, within the physical limitation of the used optics. Freely resonating B-scan devices are advantageous in that they can operate with a low energy consumption, can have a large scanning amplitude, and can be robust and small. However, they typically have a high B-scan frequency, so that the number of A-scans that can be performed in one B-scan is relatively small. This implies that the lateral resolution is limited, which is a disadvantage. As a further disadvantage this also limits options for noise reduction by lateral averaging. Temporal averaging has only a limited effectiveness, as a dominant source of noise is so-called speckle noise and detection values for corresponding imaged positions in subsequent OCT-images have a same deviation caused by speckle noise.

SUMMARY

It is a first object of the present disclosure to provide an improved optical coherence tomography system, further also denoted as an OCT-system that mitigates at least one or more of these disadvantages.

It is a second object of the present disclosure to provide an improved OCT-method, that mitigates at least one or more of these disadvantages.

The improved OCT-system according to the first object comprises a first and a second system unit.

The first system unit is configured to obtain OCT-scan data comprising a plurality of B-scan data sets from a target, such as a biological tissue. Each B-scan data set comprises a respective set of A-scan data sets. Each A-scan data set comprises a depth profile of the target. Each of a plurality of A-scan data sets in a B-scan data set specifies a proper depth-profile for a respective lateral position of the target traversed while performing the B-scan for obtaining the B-scan dataset.

The first system unit comprises an optical radiation source, beam manipulation means, a scanning device and a detector. The optical radiation source is configured to generate a beam of optical radiation and the beam manipulation means is configured to split the beam into a reference beam to be directed according to a reference path towards the beam merger and a target beam to be directed according to a target path comprising the target towards the beam merger, and to merge the beams from the reference path and the target path into a merged beam towards the detector. For practical purposes the reference path usually has a controllable length, for example in that it comprises a reference mirror having a controllable position. In some examples the beam manipulation means comprise a distinct beam splitter to split the beam into a reference beam and a target beam and a distinct beam merger to merge the beam received from the reference path and the beam received from the target path. In other examples the beam manipulation means are formed by a common component, e.g. a semi-reflecting mirror. The scanning device is arranged in the target path to direct the target beam via the target. Therewith the scanning device directs the target beam towards the surface of the target while scanning the beam in a lateral direction respective to a surface of the target, and it collects radiation of the beam scattered by the target and directs the collected radiation to the beam merger.

The first system unit is configured to obtain the OCT scan data by repeatedly obtaining an A-scan dataset from the target with a first frequency while performing the B-scan with a second frequency. In the improved OCT-system as disclosed herein, the process of repeatedly obtaining an A-scan dataset with a first frequency and the process of scanning to obtain the B-scan with a second frequency are performed with a mutually varying phase relationship. Therein the first frequency is greater than the second frequency. Typically the first frequency is greater than the second frequency by at least an order of magnitude, i.e. at least 10 times greater.

The second system unit is configured to use information about the mutually varying phase relationship when generating the OCT-image from the OCT-scan data.

Various options are available for performing an A-scan. According to a first option (time-based) an optical path length difference is varied in time by modulating a length of the reference path with the first frequency. Detection data sampled while performing an A-scan provides a depth profile. According to another option (frequency-based) a narrow bandwidth optical source is used of which the central wavelength is varied (swept) with the first frequency. In this case the acquired detection signal during the A-scan is the integrated response to the complete range over which the wavelength is swept and the depth profile is obtained by application of a Fourier transform to the detection signal. This approach is also denoted as swept-source OCT (SS-OCT).

A further option is to use spectral domain (frequency based) OCT (SD-OCT), in which a light source supplies al wavelengths within an imaging wavelength range simultaneously. In an SD-OCT the detector is provided as a spectrometer that simultaneously detects the optical signal in the plurality of wavelengths in the imaging wavelength range. As in the case of SS-OCT, a Fourier transform is applied to the detection signals for the plurality of wavelengths to obtain a depth profile. As noted, each A-scan dataset is performed for a specific lateral position. In case the A-scan is performed in a frequency based manner, all samples of the depth profile are obtained for that lateral position. If the A-scan is performed in a time-based manner, the samples of the depth profile are obtained for mutually different lateral positions due to the laterally scanning movement of the B-scan. As the A-scan frequency typically is substantially higher than the B-scan frequency, it is presumed in the context of this description that also in this case it is justified to associate the A-scan with a specific position.

As noted, each B-scan dataset comprises a plurality of A-scan datasets. The A-scan datasets can be assigned an index number indicating the order in which they are obtained during the time interval of a B-scan. A-scan datasets comprised in mutually different B-scan datasets having a same index number are performed for a relatively narrow range of lateral positions and can be grouped in a respective group with that index number. More generally, A-scan data sets may be grouped in respective lateral ranges, irrespectively whether the A-scan data sets are obtained from mutually different B-scans. For example in case the A-scans are performed during a full period of each B-scan, then a group with a lateral range may comprise an A-scan dataset obtained in a first half of the full period and a second half of the full period.

Due to the fact that A-scanning has a variable phase relationship relative to B-scanning, mutually subsequent B-scan data sets provide information of the target for mutually different sets of lateral positions. The second system unit is configured to generate an improved OCT-image from the OCT-scan data comprising the mutually subsequent B-scan data sets and the information about the mutually varying phase relationship. In this way image data with a higher lateral resolution is obtained.

This can be achieved in that the second OCT system unit that reorders the A-scan datasets in a same group according to their lateral position as indicated by the information about the mutually varying phase relationship.

In some embodiments the second OCT-system unit comprises in addition to a reorder module, a consolidation module to consolidate respective pluralities of reordered A-scan datasets into respective consolidated A-scan datasets. Consolidating a plurality of reordered A-scan datasets into a consolidated A-scan dataset implies that corresponding samples in the A-scan datasets are consolidated. I.e. the sample values of the $j_c$-th consolidated A-scan dataset are the consolidated values (e.g. the average values) of the sample values of the samples of the j-th A-scan dataset in the plurality of A-scan datasets. More generally reordered A-scan datasets in a same A-scan dataset group, i.e. within a common spatial range are consolidated. Therewith image data with reduced noise is obtained. Reduction of speckle noise is effective as it is based on image data for varying lateral positions. Reduction of temporal noise is effective regardless of the lateral position. Due to the fact that the second OCT-system unit obtains a plurality of B-scan data sets from the first OCT-system unit, the noise reduction can be obtained without a loss of resolution as compared to that of a single image retrieved with the first OCT-system unit.

In some embodiments, the consolidation module is configured to compute a consolidated sample value of a contiguous proper subset of samples in a sample set. In this connection it is noted that a proper subset of a set S1 is a subset of S1 that is not equal to S1. In other words, if S2 is a proper subset of S1, then all elements of S2 are in S1 but S1 contains at least one element that is not in S2. Therewith a noise reduction is achieved, while the lateral resolution of the OCT-image represented by the consolidated sample data is higher than that of a single OCT-image obtained from the first OCT-system unit. For example, the consolidation module computes for each sample set a first consolidated value from the sample values of the proper subset formed by the first two samples in the sample set and a second consolidated value from the sample values of the proper subset formed by the last two samples in the sample set. Here the first two samples define a first proper subset of the sample set and the last two samples define a second proper subset of the sample set. In some examples the consolidation module performs the operation in parallel for a complete A-scan.

In some embodiments the consolidation module selectively consolidates a subset of mutually subsequent samples within a lateral range of a predetermined length. This is in particular favorable for use with a first OCT-system unit with a resonant scanning device. In that case the lateral resolution is relatively low in the center of the lateral scanning range and relatively high in the periphery of the lateral scanning range due to the sinusoidal motion profile of the resonant B-scan device. As a result of the selective consolidation an OCT-output data is obtained having a more homogeneous resolution. Additionally, the groups of A-scans will be larger near the turn-around points of the resonantly operated B-scan device than in the center of the B-scan, leading to a stronger suppression of temporal noise near the turn-around points.

As noted, the process of obtaining the A-scans while performing the B-scans is performed by the first system unit with a mutually varying phase relationship. I.e. an $n^{th}$ A-scan, e.g. the first A-scan in mutually different OCT-image data sets is performed at a different phase of the scanning process in the lateral direction x. This can be achieved in various ways, e.g. in one example a value for the ratio of the first frequency and the second frequency is selected as being a non-integer value. In another example the process of repeatedly obtaining an A-scan is initiated at a varying delay time after the beginning of each B-scanning cycle. This approach can be used in embodiments wherein the first frequency is an integer multiple of the second frequency, but may also be used in combination with an approach wherein the first frequency is not an integer multiple of the second frequency.

In some embodiments of the OCT-system the information about the mutually varying phase relationship specifies a length of a first time-interval between a start of a B-scan and a start of a first A-scan subsequent to the start of the B-scan. Provided that the A-scan process is performed in a stable manner, the second OCT-system unit then estimates a length of a second time-interval between said B-scan and a start of a subsequent A-scan by addition of the length of said first time-interval and the time period corresponding to the A-scan frequency multiplied with the number of A-scans performed since the start of the first A-scan. In some embodiments, the information about the mutually varying phase relationship indicates a length of each time-interval between a start of a B-scan and a start of each A-scan subsequent to the start of the B-scan. In these embodiments the second OCT system unit does not need to compute the phase relationship for each A-scan. These embodiments are also suitable if the A-scan process is less stable.

The first system unit may also provide the absolute time of each start of an A-scan and the absolute time of each B-scan as the information about the mutually varying phase relationship.

In still other embodiments the first system unit provides as information about the mutually varying phase relationship the absolute time of each start of an A-scan and the second OCT system unit maintains a continuous record of the B-scan phase over time in order to compute the phase relationship of each A-scan relative to the B-scan.

In still further embodiments the first system unit provides as the information about the mutually varying phase relationship the instantaneous phase of the B-scan at the start of each A-scan.

As a still further option the first system unit determines the information about the mutually varying phase relationship with image registration techniques.

In some embodiments the second system unit is configured to generate mutually subsequent OCT images on the basis of two or more B-scan data sets in a moving window, wherein subsequent specimen of the moving window comprise one or more B-scan data sets in common. This renders it possible to provide for a reduction of noise and/or to provide an increased lateral resolution while maintaining a relatively high image refresh rate.

The improved OCT-method according to the second object comprises:

- obtaining a plurality of OCT-B-scans datasets from a target, each OCT-B-scan dataset comprising a set of OCT-A-scan datasets, therewith obtaining the plurality of OCT-B-scan datasets by repeatedly obtaining an A-scan dataset from the target with a first frequency while scanning the target in a lateral direction with a second frequency, wherein said repeatedly obtaining with a first frequency and said scanning with a second frequency is performed with a mutually varying phase relationship, said first frequency being greater than said second frequency,
- generating an OCT-image from the plurality of OCT-B-scan datasets, therewith taking into account said mutually varying phase relationship.

BRIEF DESCRIPTION OF THE DRAWINGS

These and other aspects are described in more detail with reference to the drawing. Therein.

DETAILED DESCRIPTION OF EMBODIMENTS

Figure 1:
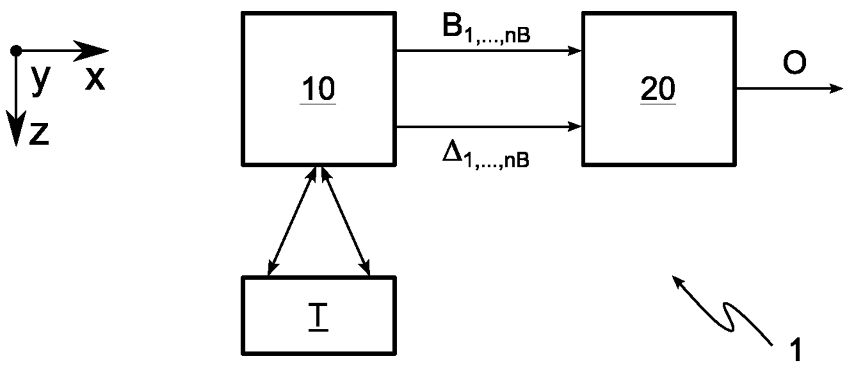
FIG. 1 schematically shows an improved optical coherence tomography system (OCT-system)

FIG. 1 schematically shows an improved optical coherence tomography, OCT, system 1 that comprises a first system unit 10 for obtaining an OCT-data set comprising a plurality of B-scan data sets $B_{1,\ nB}$ from a target T, e.g. a biological tissue. A second system unit 20 receives the OCT-data set to generate an OCT-image O.

Figure 2:
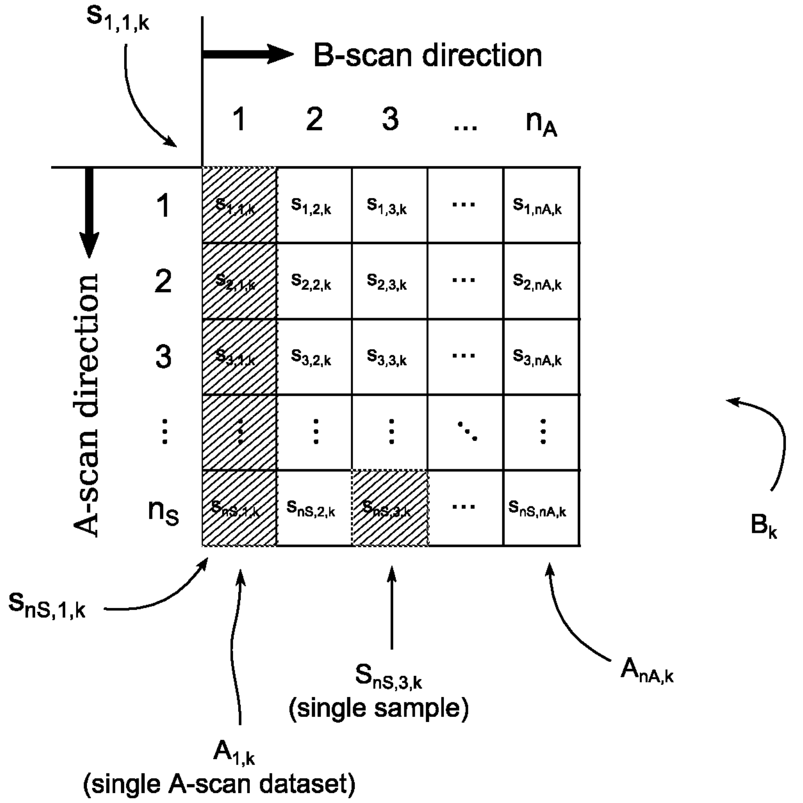
FIG. 2 schematically shows scan data obtained with a first system unit of the embodiment of FIG. 1 in a single B-scan.

As illustrated in FIG. 2, each B-scan data set $B_k$ comprises a set of A-scan data sets $A_{1,k}$,$A_{nA,k}$. Each A-scan data set comprises a depth profile (in the direction z) of the target for a particular lateral position (x) of the target that is traversed while performing the B-scan for obtaining the B-scan dataset. For example a first A-scan data set $A_{1,k}$ obtained in the B-scan $B_k$ comprises a depth profile with subsequent samples $S_{1,1,k}$, $S_{nS,1,k}$ for a first scanned lateral position. A second A-scan data set $A_{2,k}$ obtained in the B-scan $B_k$ comprises a depth profile with subsequent samples for a second scanned lateral position. Accordingly, each sample obtained with the first system unit 10 can be identified as $S_{i,j,k}$, wherein k is the number of the B-scan, i.e. $1 \le k \le nB$, j is the number of the A-scan within the set of nA datasets, i.e. $1 \le j \le nA$, and i is the index of the sample of the depth profile of the A-scan, i.e. $1 \le i \le nS$.

The first system unit 10 is configured to obtain the plurality of B-scan data sets $B_{1,\ nB}$ by repeatedly obtaining an A-scan dataset from the target with a first frequency while scanning the target in the lateral direction x with a second frequency. A scan in the lateral direction is denoted as B-scan. For now, it is presumed that the target is scanned in one lateral direction x. In alternative embodiments scanning is performed in two lateral directions x,y. The first frequency is substantially higher than the second frequency, typically at least one order of magnitude higher. For example, the first frequency is in an order of magnitude of 50 kHz to a few MHz or higher and the second frequency is in an order of magnitude of 100 Hz, to 2 kHz and higher, e.g. up to 10 kHz. A-scans are performed with a mutually varying phase relationship relative to the B-scans. In the embodiment shown the first system unit 10 indicates the phase relationship for each B-scan $B_k$ with a respective indicator $\Delta_k$. This indicates the length of a time-interval between the start of the B-scan $B_k$ and the start of the first A-scan $A_{1,k}$ in that B-scan. In alternative embodiments, the first system unit 10 provides an indication of the phase relationship for each A-scan $A_{1,k}$, $A_{nA,k}$ in the B-scan or even for each sample $S_{i,j,k}$. Typically however a single indication per B-scan suffices.

Figure 3:
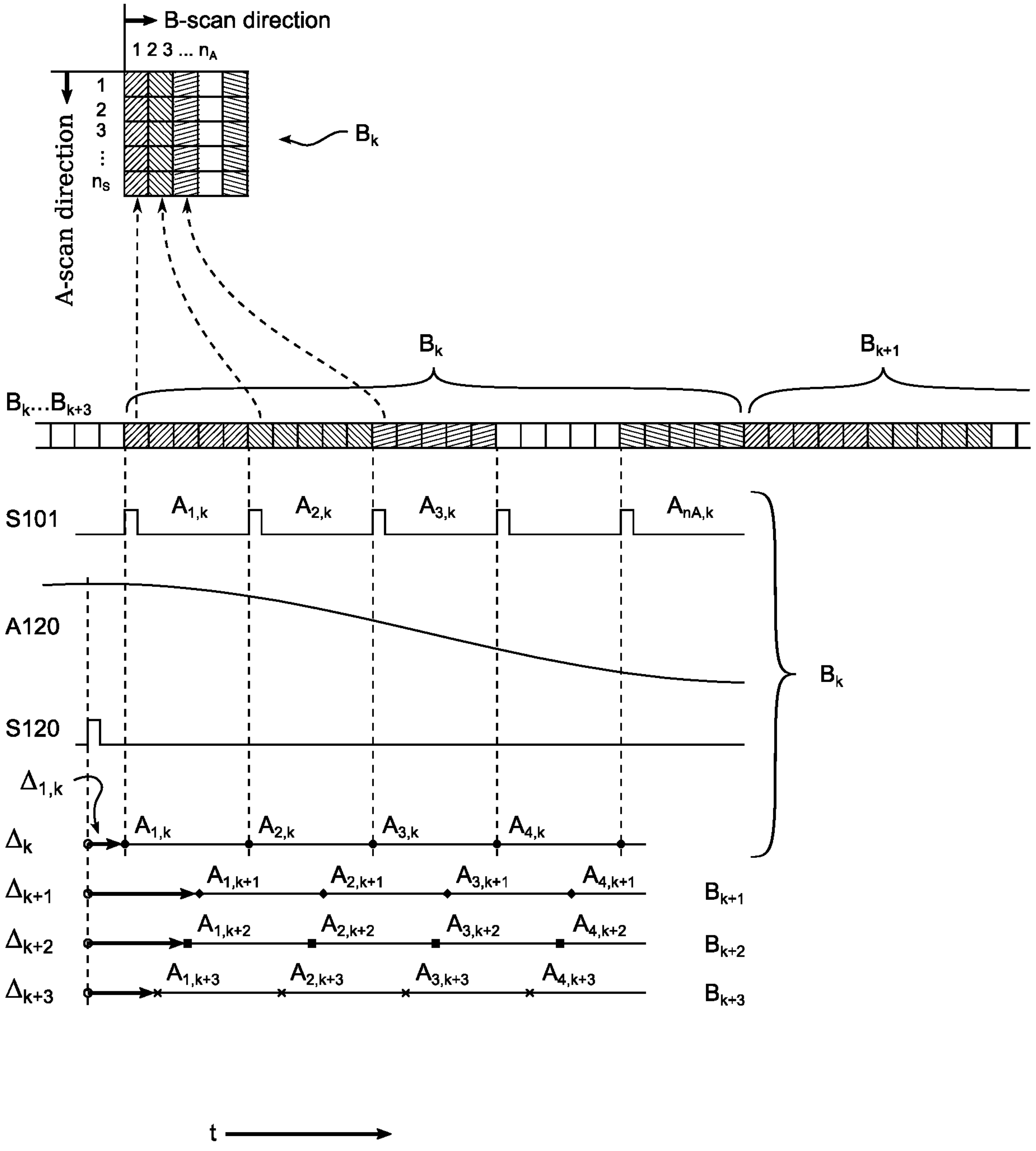
FIG. 3 schematically indicates an example of an OCT-data set comprising a plurality of B-scan data sets.

FIG. 3 schematically indicates an example of an OCT-data set comprising a plurality of B-scan data sets $B_k$, $B_{k+1}$, $B_{k+2}$, $B_{k+3}$, that is provided by the first system unit 10 together with the phase relationship indication $\Delta_k$, $\Delta_{k+1}$, $\Delta_{k+2}$, $\Delta_{k+3}$ to the second system unit 20. By way of example it is presumed that the second system unit 20 processes four B-scan data sets each time to generate a single OCT-image O. However, in other examples the second system unit 20 may use a smaller or larger number of data sets. Also, in some examples the second system unit 20 may use mutually overlapping pluralities of B-scan datasets, e.g. B-scan data sets $B_1$, $B_2$, $B_3$, $B_4$ to generate a first output image, data sets $B_3$, $B_4$, $B_5$, $B_6$ to generate a second output image, data sets $B_5$, $B_6$, $B_7$, $B_8$ to generate a third output image etc.

The upper part of FIG. 3 schematically shows a single B-scan dataset $B_k$ as shown in more detail in FIG. 2. FIG. 3 further shows how a stream of data in subsequent B-scan datasets $B_{k,k+3}$ is provided to the second OCT system unit 20. FIG. 3 further shows a trigger signal S101 that indicates the point in time at which each A-scan is initiated while the B-scan k is performed. Furthermore, A120 indicates the lateral position that is currently being scanned as part of the B-scan k, e.g. indicated by an angle of a scanning mirror. In this example, the B-scan has a sinusoidal shape. It may however alternatively have a triangular shape, a sawtooth shape, or staircase shape. The signal S120 indicates the onset of the B-scan k. Directly below the signal S120, FIG. 3 shows the phase relationship of the A-scans relative to the B-scan wherein they are performed. For example $\Delta_{1,k}$, further denoted as $\Delta_k$, indicates the length of the time interval expiring between the onset of the B-scan k and the time of initiating the first A-scan $\Delta_{1,k}$. Likewise, $\Delta_{k+1}$, $\Delta_{k+2}$, and $\Delta_{k+3}$, indicate the length of the time interval expiring between the onset of the B-scan k+1, k+2, k+3 and the time of initiating the first A-scan $A_{1,k+1}$, $A_{1,k+2}$, $A_{1,k+3}$.

Due to the fact that A-scanning is performed with a variable phase relationship relative to B-scanning, mutually subsequent B-scan data sets provide information of the target for mutually different sets of lateral positions. The second system unit 20 is configured to generate an improved OCT-image O from the OCT-scan data comprising the mutually subsequent B-scan data sets $B_{1,nB}$ and the information $\Delta_{1,nB}$ about the mutually varying phase relationship.

Figure 4:
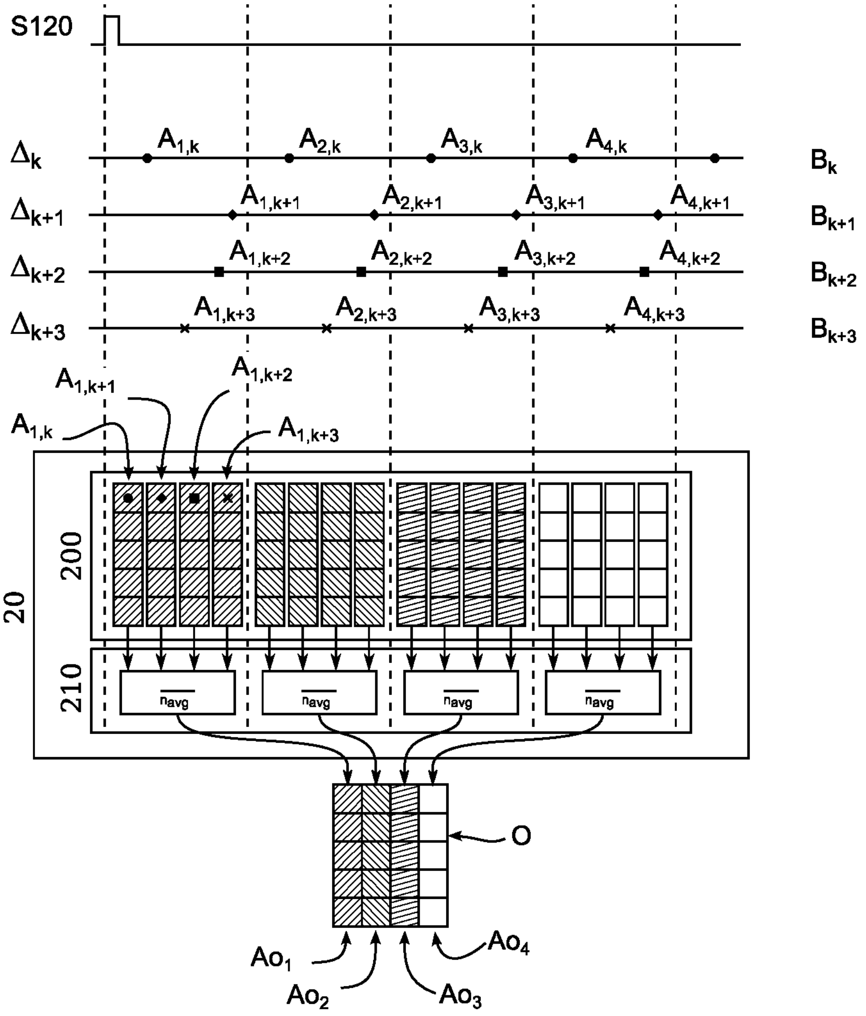
FIG. 4 schematically indicates a first example of a second OCT system unit in an embodiment of the improved OCT-system.

A first example of the second OCT system unit 20 is schematically illustrated in FIG. 4. As shown therein, the second OCT system unit 20 receives the plurality of B-scan data sets, e.g. the four consecutive B-scan datasets denoted $B_k$, $B_{k+1}$, $B_{k+2}$, $B_{k+3}$. In the embodiment shown, a reorder module 200 of the second OCT system unit 20 reorders the data comprised in the plurality of B-scan data sets as schematically shown in FIG. 4. Therewith the j-th A-scan datasets of all B-scans are grouped. For example FIG. 4 shows how the first A-scan datasets $A_{1,k}$, $A_{1,k+1}$, $A_{1,k+2}$, $A_{1,k+3}$ are grouped. In a consolidation module 210 samples having a corresponding pair i,j of sample indices within their A-scan dataset are consolidated. That is samples $S_{i,j,k}$, $S_{i,j,k+1}$, $S_{i,j,k+2}$, and $S_{i,j,k+3}$ are consolidated, in that a consolidated value of their sample values is computed. Therewith a consolidated A-scan $Ao_1$, $Ao_2$, $Ao_3$, $Ao_{nA}$ is obtained for each group of A-scans. The nA consolidated A-scans form the resulting OCT image O. In this example the consolidated value is the average value of the values of samples having a corresponding pair of sample indices. In another example, a median value of the sample values is selected. In this case the number of samples should be odd. Due to the fact that the consolidated values are obtained for mutually different lateral positions, due to the variable scanning phase relationship, a more efficient speckle reduction is achieved than would be the case if A-scan-datasets $A_{1,k}$, $A_{1,k+1}$, $A_{1,k+2}$, $A_{1,k+3}$ were obtained always at the same time relative to the start of the B-scan. Additionally, consolidation reduces the temporal noise.

Figure 4A:
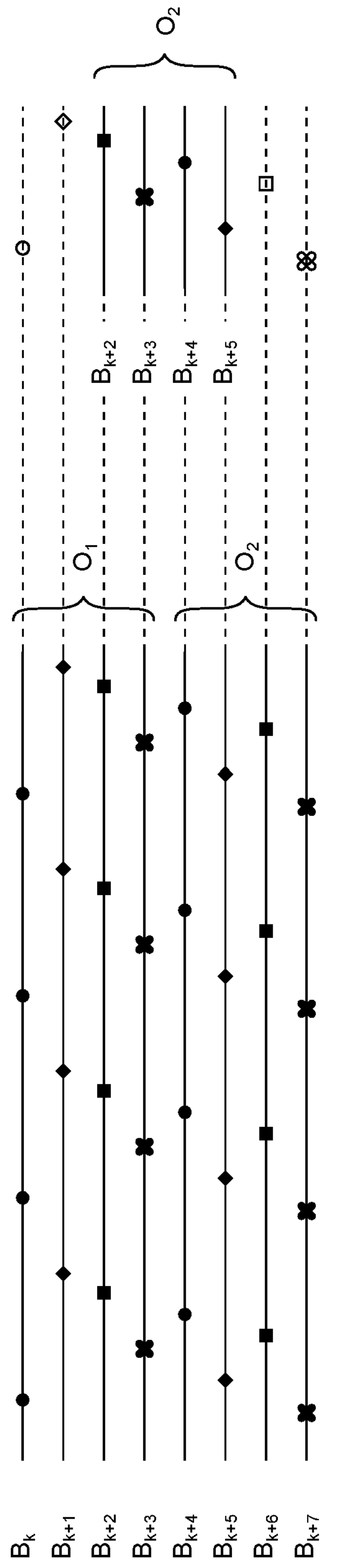
FIG. 4A schematically indicates a variation of the example of FIG. 4.

Hence, the resulting OCT image O obtained after consolidation can be considered as comprising a single B-scan dataset with a set of A-scan data sets $Ao_1$, $Ao_{nA}$. If a consolidated A-scan $Ao_j$ is computed for each group of A-scan datasets $A_{j,k}$, $A_{j,k+1}$, $A_{j,k+nK}$ with the same index j, then the lateral resolution of the output image O remains the same and nAo=nA. Otherwise nAo>nA. In some example a more fine-grained consolidation is applied. I.e. instead of performing the same consolidation operation to all samples within an A-scan, the consolidation may be dependent from sample to sample. E.g. samples having a different sample index in an A-scan in the output image O may be consolidated from samples taken from mutually different groups of A-scans as provided by the first system unit 10. It is noted that consolidation of a plurality of samples either in a fine-grained manner or in a course grained manner can be achieved in various ways, e.g. the consolidated sample value may be the mean value of the input sample values from which it is consolidated, a median value selected from these input sample values. Still further consolidated sample values may be computed by an interpolation of the input sample values, e.g. a linear interpolation, or a higher order interpolation, e.g. a cubic interpolation. As shown in FIG. 4A it is not necessary that each resulting OCT image $O_1$, $O_2$, $O_3$ is generated by the second OCT system unit 20 from mutually exclusive B-scan data sets. In an embodiment, the subsequent resulting OCT images $O_1$, $O_2$, $O_3$ are generated on the basis of a moving window wherein subsequent specimen of the moving window partially overlap, i.e. subsequent specimen of the moving window partially comprise one or more B-scan data sets in common. The n-th OCT-image is generated on the basis of the B-scan datasets $B_{k+(n-1)/2}$, $B_{k+(n-1)/2+1}$, $B_{k+(n-1)/2+2}$, $B_{k+(n-1)/2+3}$. For example, a first OCT-image $O_1$ is generated with the B-scan datasets $B_k$, $B_{k+1}$, $B_{k+2}$, $B_{k+3}$, a second OCT-image $O_1$ is generated with the B-scan datasets $B_{k+2}$, $B_{k+3}$, $B_{k+4}$, $B_{k+5}$ and so on. Therewith a noise reduction is achieved while maintaining a relatively high frame rate and a low latency.

Figure 5:
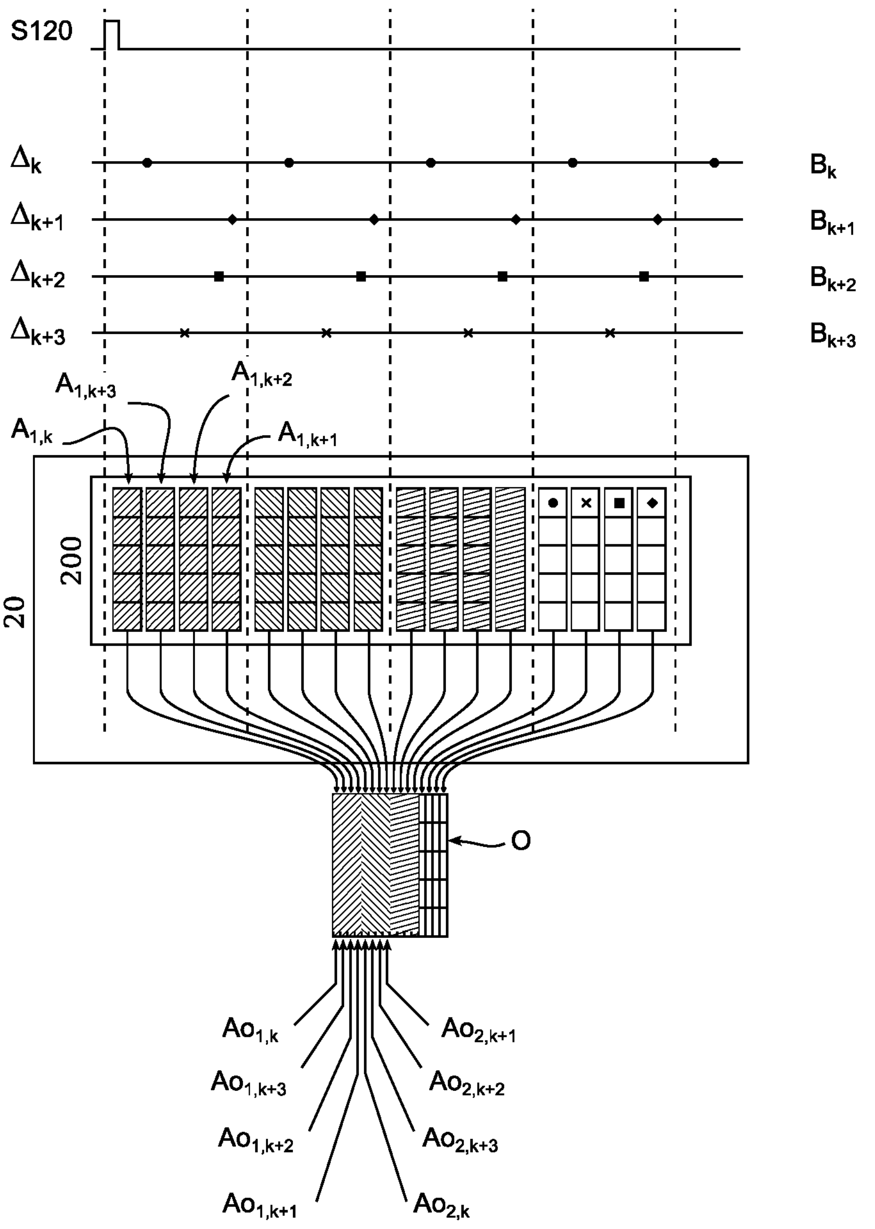
FIG. 5 schematically indicates a second example of a second OCT system unit in an embodiment of the improved OCT-system.
Figure 6:
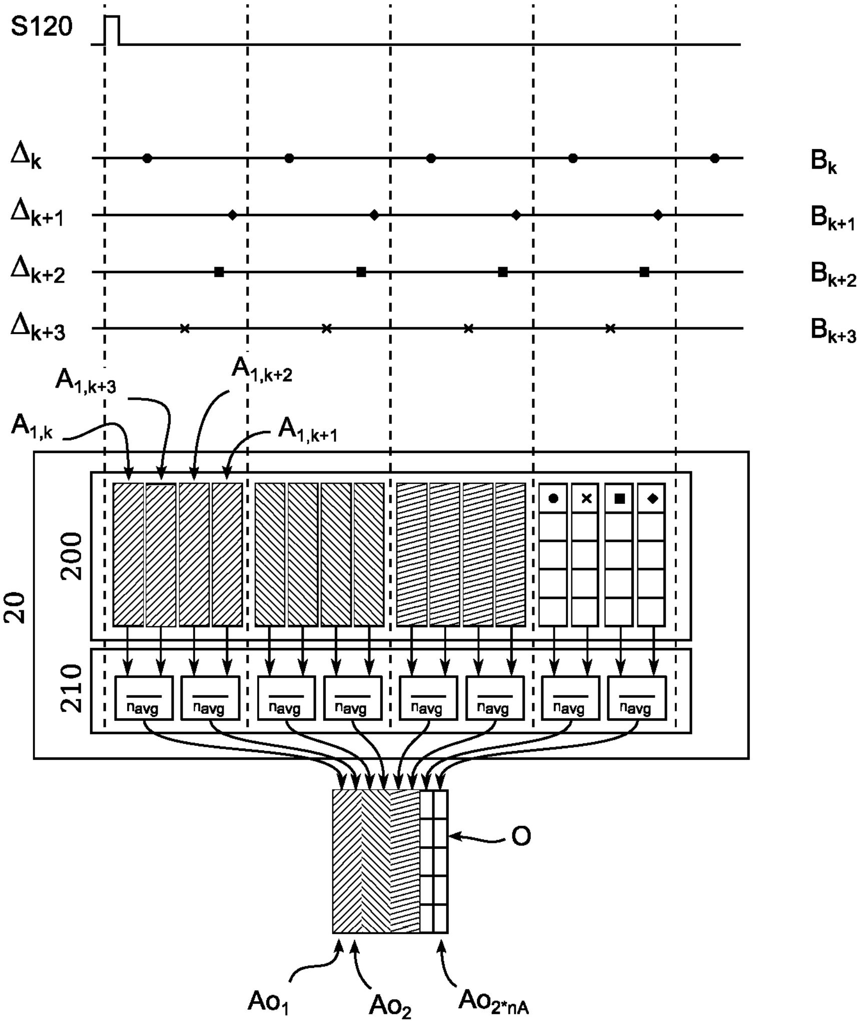
FIG. 6 schematically indicates a third example of a second OCT system unit in an embodiment of the improved OCT-system.

FIG. 5 shows a further embodiment, wherein the reorder module 200 of the second OCT system unit 20, when reordering the image data, further reorders the A-scan datasets in groups according to their lateral position as indicated by the phase relationship indication $\Delta_k$, $\Delta_{k+1}$, $\Delta_{k+2}$, $\Delta_{k+3}$. For example the A-scan datasets in the group of first A-scan datasets are reordered as $A_{1,k}$, $A_{1,k+3}$, $A_{1,k+2}$, $A_{1,k+1}$. The same reordering is applied to all subsequent groups of A-scan datasets, based on the presumption that the time interval between initiation of mutually successive A-scans is substantially constant. Accordingly, in this case it suffices that the first OCT-system unit 10 provides as the lateral position indication a length $\Delta_k$ of a time interval between the onset of a B-scan $B_k$ (indicated by the trigger signal S120) and the start of the first A-scan $A_{1,k}$ performed during said B-scan. In this embodiment an output image O with an improved lateral image resolution is obtained. In this embodiment, the samples are not consolidated FIG. 6 shows a further embodiment of the improved OCT-system. In the embodiment of FIG. 6, the second OCT-system unit 20 comprises a consolidation module 210 that is configured to compute a consolidated sample value of a contiguous proper subset of samples in a sample set. For example, as shown in FIG. 6 the consolidation module 210 computes for each sample set a first consolidated value from the sample values of the proper subset formed by the first two samples in the sample set and a second consolidated value from the sample values of the proper subset formed by the last two samples in the sample set. Here the first two samples define a first proper subset of the sample set and the last two samples define a second proper subset of the sample set. In the embodiment shown the consolidation module 210 performs the operation in parallel for a complete A-scan. For example, the consolidation is performed for all pairs of samples $S_{i,1,k}$ and $S_{i,1,k+3}$ from the A-scan datasets $A_{1,k}$ and $A_{1,k+3}$ and also for all pairs of samples $S_{i,1,k+2}$ and $S_{i,1,k+1}$ from the A-scan datasets $A_{1,k+2}$ and $A_{1,k+1}$. Therewith the second OCT-system unit 20 of the improved OCT-system provides an output image O comprising A-scan datasets $Ao_1$ $Ao_{2*nA}$. In this embodiment the lateral resolution is increased and the noise is reduced.

Figure 7:
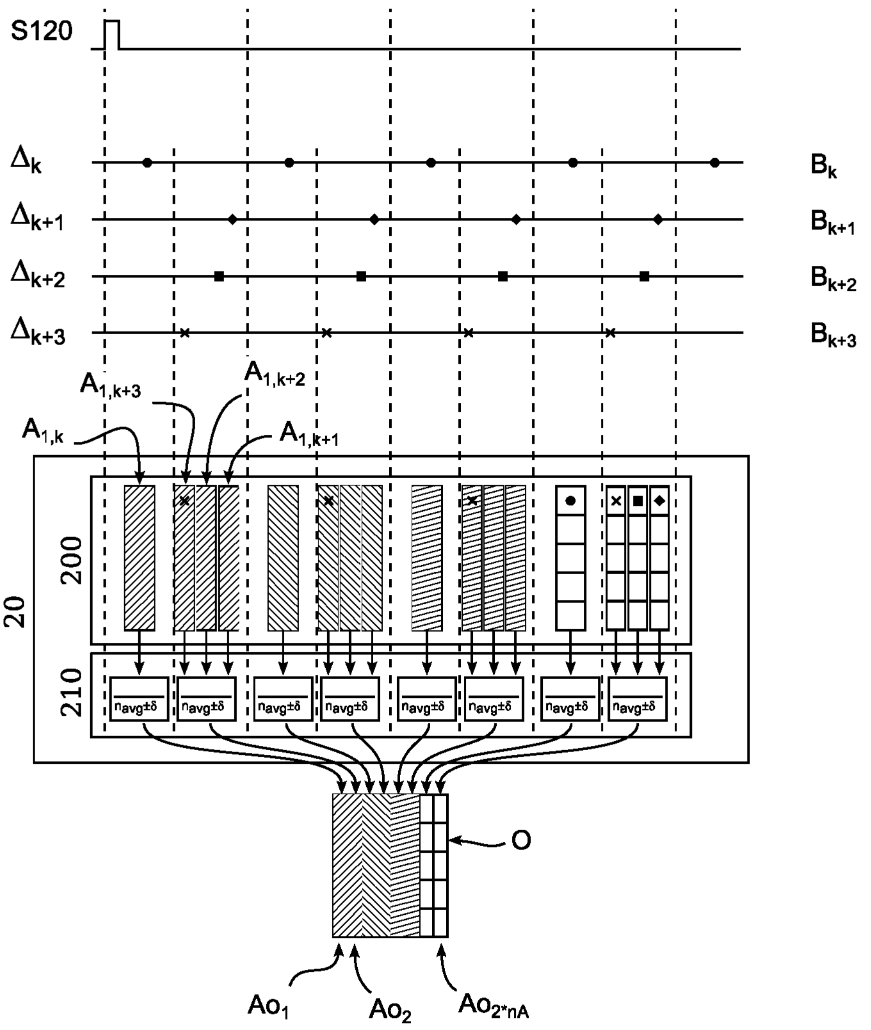
FIG. 7 schematically indicates a fourth example of a second OCT system unit in an embodiment of the improved OCT-system.

As shown schematically in FIG. 7, it is not necessary that the size of the subset is fixed. Also, individual samples or A-scans may be exempted from consolidation. For example, in FIG. 7 this is the case in that the sample data consolidation module 210 selectively consolidates a subset of mutually subsequent samples within a lateral range of a predetermined length. In the example of FIG. 7, a first lateral range comprises a single A-scan dataset $A_{1,k}$ that comprises samples $S_{i,1,k}$. The first A-scan $A_{1,k}$ is provided as such as part of the OCT-image O. A second lateral range of the predetermined length comprises three A-scan datasets $A_{1,k+3}$, $A_{1,k+2}$, $A_{1,k+1}$. The corresponding samples $S_{i,1,k+3}$, $S_{i,1,k+2}$, $S_{i,1,k+1}$ are consolidated for each value of the index i. In this case the average value is computed. Alternatively, the median value may be computed. Therewith the three A-scan datasets are consolidated into a single secondary A-scan dataset $Ao_2$ in the OCT-image O.

In the above-mentioned examples it is presumed that consolidation is applied to samples from A-scan datasets $A_{j,k}$ having the same A-scan index j, but mutually different B-scan index, however in alternative examples consolidation is also/alternatively applied to samples from mutually neighboring A-scan datasets $A_{j,k}$, $A_{j+1,k}$, i.e. having mutually different A-scan indexes.

It is noted that the number of A-scan datasets consolidated into a single secondary A-scan dataset may vary from one OCT image to the other due to the potentially stochastic nature of the phase relation. Therefore, the number of A-scan datasets consolidated into a single secondary A-scan dataset may be 1 and 3 as illustrated in FIG. 7, but may be 2 and 2, or 3 and 1, in subsequent OCT images. In this example the number of A-scan datasets in a group is 4, but this number is only used as an example. This number may be different in another embodiment or in subsequent images. It may even be different for subsequent secondary A-scan datasets within a single OCT image. It may be adapted dynamically in order to accommodate variations in the first and second frequencies, or may be adapted statically to account for the sinusoidal motion profile of a B-scan device operated at resonance. In the latter case, the consolidation module selectively consolidates a subset of mutually subsequent samples within a lateral range of a predetermined length. In that case the lateral resolution of an OCT-image obtained with a single B-scan is relatively low in the center of the lateral scanning range and relatively high in the periphery of the lateral scanning range due to the sinusoidal motion profile of the resonant B-scan device. As a result of the selective consolidation an OCT-output data set is obtained having a more homogeneous resolution. Additionally, the groups of A-scans will be larger near the turn-around points of the resonantly operated B-scan device than in the center of the B-scan, leading to a stronger suppression of temporal noise near the turn-around points.

Figure 8:
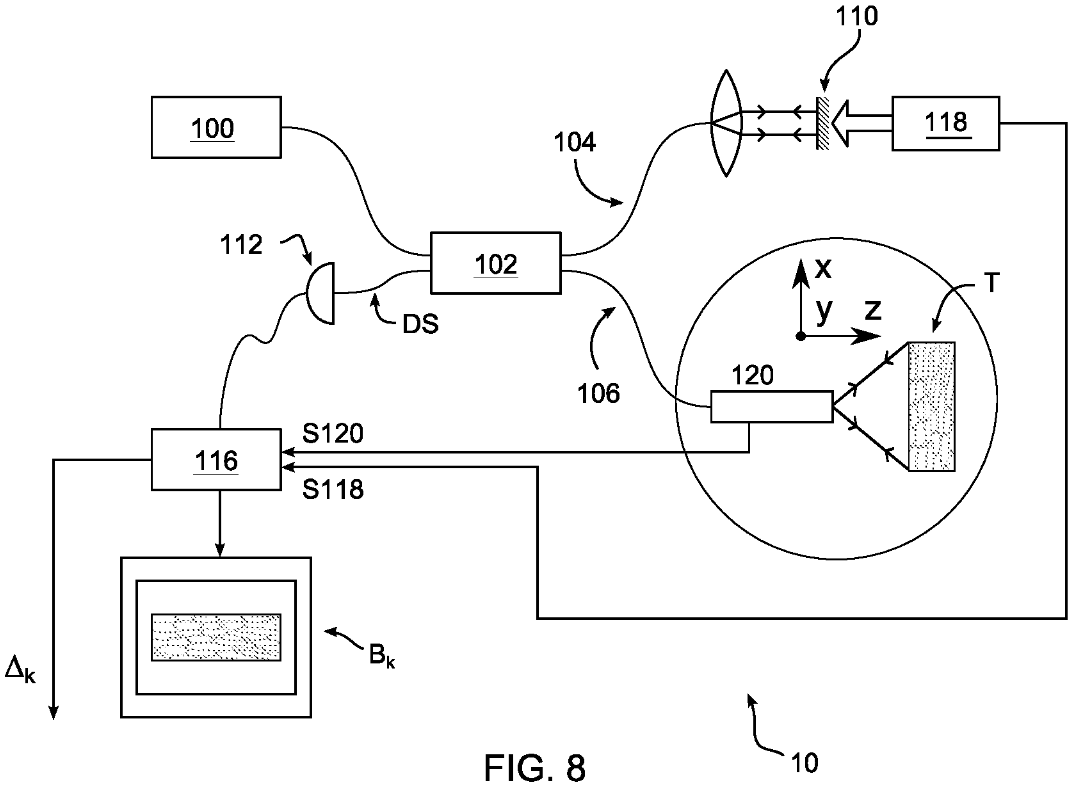
FIG. 8 schematically indicates a first example of a first OCT system unit in an embodiment of the improved OCT-system.

FIG. 8 shows an example of a first system unit 10, in this example a time domain OCT imaging device. In a beam splitter/combiner 102 a beam from a light source 100, in this case broadband optical radiation having a short coherence length, is split into a reference arm 104 and a sample arm 106. The beam in the sample arm 106 is guided via a scanning device 120 to a sweeping lateral position x(t) at the target T. The scanning device 120 collects optical radiation that is scattered by the target to be guided back towards the beam splitter/combiner 102. The beam in the reference arm reflects back from a mirror 110 placed at the end of the reference arm towards the beam splitter/combiner 102 where it is combined with the beam of scattered light received in the sample arm 106. This results in an interference signal DS, which is detected in detector 112. The actuator 118 periodically displaces the reference mirror 110 to vary a reference path length in accordance with a depth z(t) of the target T to be scanned. Accordingly, each combination of a scanning position of the scanning device 120 and a mirror position of the reference mirror 110 correspond to a sampled position with coordinates x(t), z(t) within the target T and translated into an A-scan dataset by data processing device 116. The frequency $f_z$ with which the actuator 118 periodically displaces the reference mirror 110 (A-scan) is substantially higher, e.g. two or three orders of magnitude higher, than the frequency $f_x$ with which the scanning device 120 sweeps the beam (B-scan) in the lateral direction x. Hence, while the scanning device 120 performs a single B-scan, the actuator 118 performs a plurality of A-scans. Therewith during a single B-scan k, a respective set of A-scan data sets ($A_{1,k}$, $A_{nA,k}$) is obtained. The A-scans are performed with a mutually varying phase relationship relative to the B-scans. Hence, A-scan datasets $A_{j,k}$, $A_{j,k'}$ having a same A-scan index j in mutually different B-scan datasets k, k' are obtained at a mutually different point in time relative to the start of the B-scan, and therewith provide respective depth-profiles for respective lateral positions of the target. The mutually varying phase relationship is realized most easily by choosing the ratio $f_z/f_x$ as a non-integer number, e.g. $f_z/f_x$=146.27. Alternatively, a variation in the phase relationship may be introduced by a phase shift module. When using two freely resonating scanning devices, it is unlikely that the frequency ratio would be an exact integer number for a prolonged time interval. Alternatively, a control circuit may be used to actively tune one of the first and second frequencies to prevent the frequency ratio from being an integer number, i.e. preventing it from being N:1, in which Nis an integer number. Alternatively, the ratio may be a real number, e.g. R:1, in which R is a real number. Alternatively, the ratio may be a ratio of two integer numbers, e.g. 201:2. The ratio being a ratio of two integer numbers is advantageous because the phase relationship will exhibit a repeating pattern, which will lead to deterministically repeating lateral positions of the A-scan datasets in the OCT image. In other examples a spontaneous drift may suffice. As a result, the first system unit 10 provides subsequent B-scan datasets k, k+1, wherein each B-scan data set comprises a respective set of A-scan data sets ($A_{1,k}$, $A_{nA,k}$). Each B-scan data set comprises respective depth-profiles for a respective set of lateral positions of the target traversed while performing each B-scan. Data processing device 116 provides at its output the successive B-scan datasets $B_k$ and an indication $\Delta_k$ of the phase relationship.

It is noted that the number of A-scan datasets in a single B-scan dataset (nA) may vary from one B-scan to the other.

Figure 9:
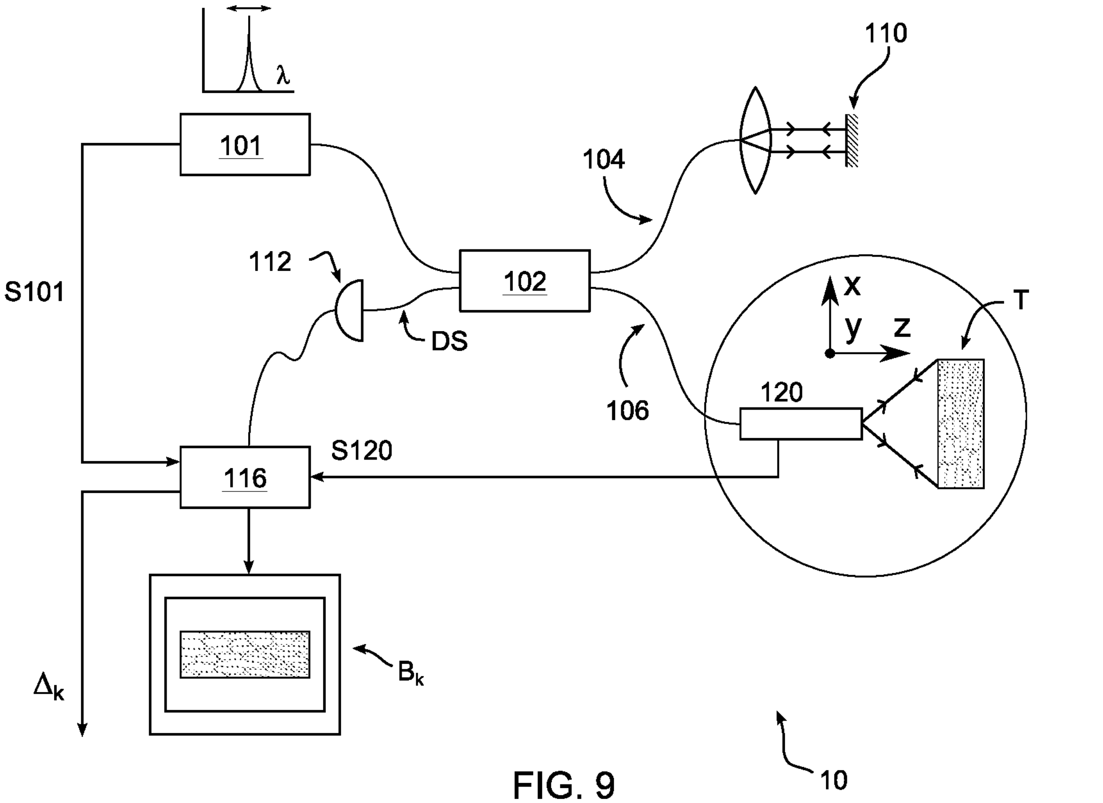
FIG. 9 schematically indicates a second example of a first OCT system unit in an embodiment of the improved OCT-system.

FIG. 9 shows an alternative embodiment. Parts therein corresponding to those in FIG. 8 have a same reference number. FIG. 9 is an example of a Fourier domain OCT device, specifically a swept-source OCT device, comprising instead of the broadband light source 100 of FIG. 8, a narrow band light source 101, of which the central wavelength is varied (swept) in an A-scan. In this case the mirror 110 is maintained at a fixed position. Optionally the mirror may be repositioned for mutually different measurements. The acquired interference signal DS is the integrated response to the complete wavelength range that is scanned by the sweeping light source during the A-scan. All fringes are superimposed in one signal, and the frequency of the different fringes corresponds with the different path lengths. The data processing device 116 samples the detected interference signal obtained by the detector 112 and performs a Fourier transform to the sampled signal and therewith obtains a complete depth scan comprising a complete set of samples, each indicative of the reflectance of the target as a function of depth z, at the scanned position x. In this case the signal S101 indicates the start of each A-scan. Likewise, data processing device 116 provides at its output the successive B-scan datasets $B_k$ and an indication $\Delta_k$ of the phase relationship.

Figure 10:
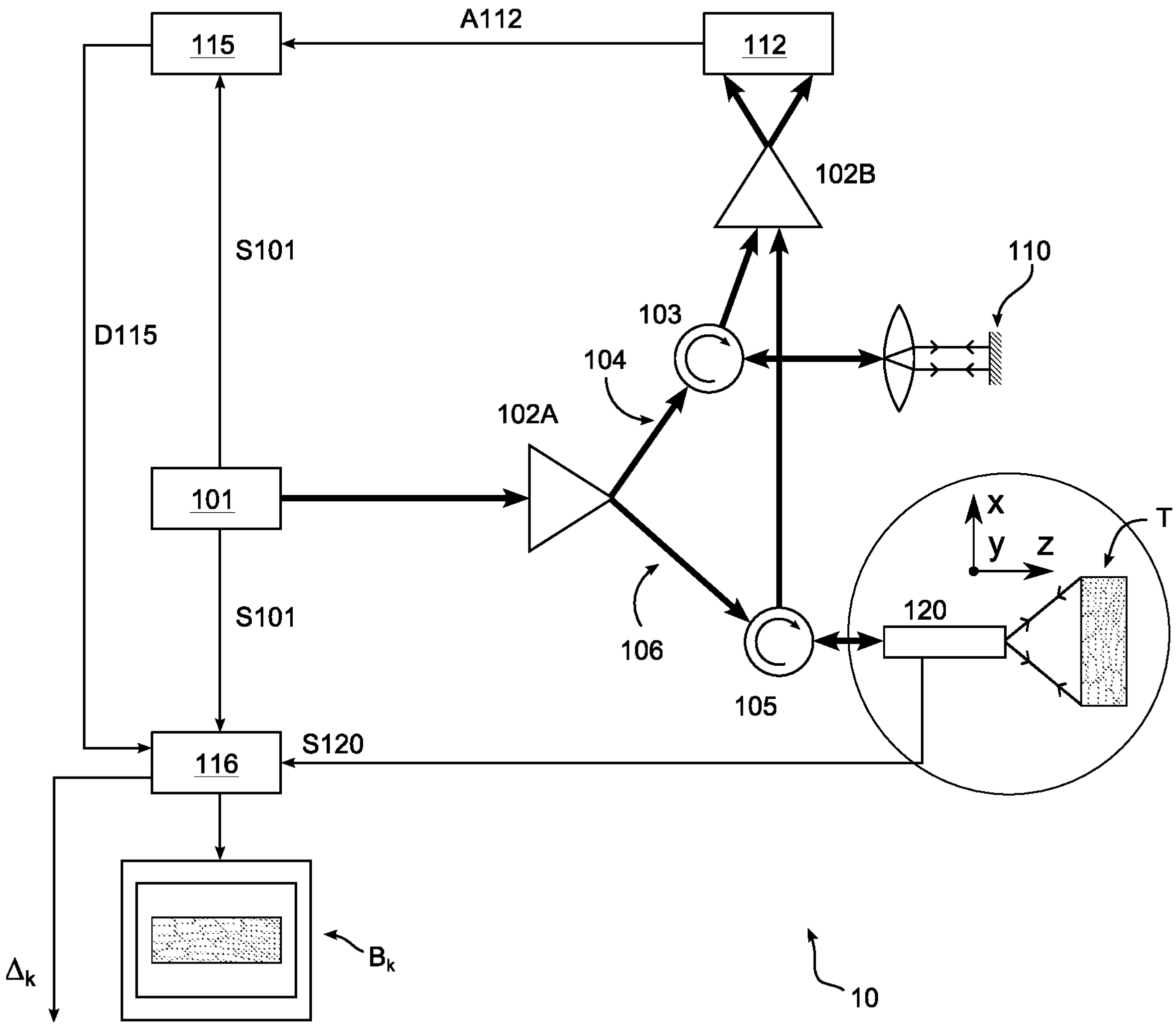
FIG. 10 schematically indicates a third example of a first OCT system unit in an embodiment of the improved OCT-system.

FIG. 10 shows another example of a Fourier domain OCT device as the first OCT system unit 10. Parts therein corresponding with those in FIG. 9 have a same reference number. The OCT-system unit 10 as shown in FIG. 10 comprises a separate component 102A serving as the beam splitter and a separate component 102B serving as the beam combiner. The reference arm 104 extends from the beam splitter 102A via a first circulator 103 to the reference mirror 110 and again via the first circulator 103 to the beam combiner 102B. The sample arm 106 extends via a second circulator 105 via the scanning device 120 to the target T and via the scanning device 120 via the second circulator 105 to the beam combiner 102B. Sampler 115 receives the analog detection signal A112 and provides an array D115 of sample data in each A-scan, which is processed by the signal processing device 116, which provides for each B-scan a B-scan dataset $B_k$ and phase relationship information $\Delta_k$ at its output to be processed by the second OCT-system unit 20.

The invention claimed is:

1. An optical coherence tomography, OCT, system comprising:

a first system unit configured for obtaining OCT-scan data comprising a plurality of B-scan data sets from a target, each B-scan data set comprising a respective set of A-scan data sets, respective A-scan data sets in a respective set of A-scan data sets comprising respective depth-profiles for respective lateral positions of the target traversed while performing each B-scan; and a second system unit configured to generate an OCT-image from the OCT-scan data, the first system unit comprising:

an optical radiation source configured to generate a beam of optical radiation;

beam manipulation means configured to split the beam into a reference beam to be directed according to a reference path and a target beam to be directed according to a target path comprising the target and to merge the reference beam and the target beam into a merged beam;

a scanning device arranged in the target path to direct the target beam towards the target while scanning the beam in a lateral direction respective to a surface of the target;

a detector to receive the merged beam;

wherein the first system unit is configured to obtain the OCT scan data by repeatedly obtaining an A-scan from the target with a first frequency while performing the B-scan with a second frequency, wherein said repeatedly obtaining with a first frequency and said scanning with a second frequency is performed with a mutually varying phase relationship, said first frequency being greater than said second frequency, and wherein the second system unit is configured to use information about said mutually varying phase relationship when generating the OCT-image from the OCT-scan data.

2. The optical coherence tomography, OCT, system, wherein the scanning device is configured to be operated at, or close to, its resonance frequency.

3. The OCT-system according to claim 1, wherein the A-scan frequency is a non-integer multiple of the B-scan frequency.

4. The OCT-system according to claim 3, further comprising a control circuit to actively tune at least one of the A-scan frequency and the B-scan frequency to prevent the ratio of the A-scan frequency to the B-scan frequency from being an integer number.

5. The OCT-system according to claim 1, wherein the first system unit provides as the information about said mutually varying phase relationship an indication of a length of a first time-interval between a start of a B-scan and a start of a first A-scan subsequent to the start of the B-scan and wherein the second OCT system unit is configured to estimate a length of a second time-interval between said B-scan and a start of a subsequent A-scan by addition of the length of said first time-interval and the time period corresponding to the A-scan frequency multiplied with the number of A-scans performed since the start of the first A-scan.

6. The OCT-system according to claim 1, wherein the information about the mutually varying phase relationship indicates a length of each time-interval between a start of a B-scan and a start of each A-scan subsequent to the start of the B-scan.

7. The OCT-system according to claim 1, wherein the information about the mutually varying phase relationship specifies the absolute time of each start of an A-scan and the absolute time of the start of each B-scan.

8. The OCT-system according to claim 1, wherein the information about the mutually varying phase relationship specifies the absolute time of each start of an A-scan and maintains a continuous record of the B-scan phase over time.

9. The OCT-system according to claim 1, wherein the information about the mutually varying phase relationship comprises the instantaneous phase of the B-scan at the start of each A-scan.

10. The OCT-system according to claim 1, wherein the second OCT system unit determines the lateral shift of each group of A-scans in a B-scan relative to previous B-scans using image registration techniques.

11. The OCT-system according to claim 1, wherein the second system unit comprises a reorder module configured to arrange respective groups of A-scans having the same index values in mutually different B-scan data sets and to reorder the A-scans according to their lateral position as determined by the information on the relative phase relationship.

12. The OCT-system according to claim 1, wherein the second system unit comprises a consolidation module that is configured to compute a respective consolidated A-scan dataset from a plurality of A-scans.

13. The OCT-system according to claim 12, wherein the consolidation module is configured to compute a respective consolidated A-scan dataset for a respective contiguous proper subset of a set of mutually corresponding A-scan datasets in the plurality of B-scans data sets.

14. The OCT-system according to claim 13, wherein the consolidation module is configured to compute the respective consolidated A-scan dataset for a respective contiguous proper subset corresponding to a predetermined lateral range.

15. The OCT-system according to claim 14, wherein the consolidation module selectively consolidates a subset of mutually subsequent samples within a lateral range of a predetermined length.

16. The OCT-system according to claim 1, wherein the second system unit is configured to generate mutually subsequent OCT images on the basis of two or more B-scan data sets in a moving window, wherein subsequent specimen of the moving window comprise one or more B-scan data sets in common.

17. An optical coherence tomography, OCT, method comprising:

obtaining a plurality of OCT-B-scan datasets, from a target, each OCT-B-scan dataset comprising a set of OCT-A-scan datasets, therewith obtaining the plurality of OCT-B-scan datasets by repeatedly obtaining an A-scan dataset from the target with a first frequency while scanning the target in a lateral direction with a second frequency, wherein said repeatedly obtaining with a first frequency and said scanning with a second frequency is performed with a mutually varying phase relationship, said first frequency being greater than said second frequency, generating an OCT-image from the plurality of OCT-B-scan datasets, therewith taking into account said mutually varying phase relationship.

18. The OCT method according to claim 17, wherein said lateral scanning is performed with a scanning device that is operated at, or close to, its resonance frequency.

19. The OCT method according to claim 17, wherein the first frequency is a non-integer multiple of the second frequency.

20. The OCT method according to claim 19, further comprising actively tuning at least one of the first frequency and the second frequency to prevent the ratio of the first frequency to the second frequency from being an integer number.

* * * * *